US010422616B2

(12) United States Patent
Orsini et al.

(10) Patent No.: US 10,422,616 B2
(45) Date of Patent: Sep. 24, 2019

(54) HYBRID SPRING AND ELECTRIC MOTOR TAPE RULE

(71) Applicant: Stanley Black & Decker, Inc., New Britain, CT (US)

(72) Inventors: Antony Orsini, Southington, CT (US); Bruce Eidinger, Southington, CT (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 10 days.

(21) Appl. No.: 15/643,565

(22) Filed: Jul. 7, 2017

(65) Prior Publication Data

US 2019/0011244 A1   Jan. 10, 2019

(51) Int. Cl.
*G01B 3/10* (2006.01)
*F03G 1/02* (2006.01)
*F16F 1/12* (2006.01)
*F16F 1/10* (2006.01)

(52) U.S. Cl.
CPC .............. *G01B 3/1005* (2013.01); *F03G 1/02* (2013.01); *F16F 1/121* (2013.01); *F16F 1/10* (2013.01); *G01B 2003/103* (2013.01); *G01B 2003/1028* (2013.01); *G01B 2003/1043* (2013.01)

(58) Field of Classification Search
CPC .............. G01B 3/10; G01B 2003/1028; G01B 2003/103
See application file for complete search history.

(56) References Cited

U.S. PATENT DOCUMENTS

| 3,128,557 A | | 4/1964 | Childs John | |
|---|---|---|---|---|
| 4,037,326 A | * | 7/1977 | Booth | A01K 91/08 242/223 |
| 4,057,904 A | * | 11/1977 | Vrabel | G01B 3/11 33/700 |
| 4,161,781 A | * | 7/1979 | Hildebrandt | G01B 3/10 33/763 |
| 4,189,107 A | | 2/1980 | Grillier et al. | |
| 4,434,952 A | * | 3/1984 | Czerwinski | G01B 3/1041 242/375.2 |
| 4,532,709 A | | 8/1985 | Leumann et al. | |
| 4,551,847 A | * | 11/1985 | Caldwell | G01B 3/1061 33/755 |
| 4,575,944 A | * | 3/1986 | Lin | G01B 3/1061 250/237 G |
| 4,765,063 A | * | 8/1988 | Sing | G01B 11/02 33/707 |
| 5,044,089 A | * | 9/1991 | Petkovic | G01B 3/1005 242/390.2 |
| 5,104,056 A | * | 4/1992 | Jannotta | B65H 75/38 242/373 |
| 5,245,761 A | * | 9/1993 | Waldherr | G01B 3/1005 242/381.3 |

(Continued)

*Primary Examiner* — Harshad R Patel
*Assistant Examiner* — Tran M. Tran
(74) *Attorney, Agent, or Firm* — Medler Ferro Woodhouse & Mills, PLLC

(57) ABSTRACT

A tape rule having a housing, a hub, a reel, a tape, a spring, and a motor. The hub and reel are rotatably mounted within the housing. The tape is wound around the reel. The spring is wound around the hub and is attached to at least one of the reel and the tape. The motor is disposed adjacent to the hub and is configured, when activated, to rotate the hub to adjust an amount by which the spring is wound around the hub.

20 Claims, 12 Drawing Sheets

(56) References Cited

U.S. PATENT DOCUMENTS

| | | | | |
|---|---|---|---|---|
| 5,386,643 A * | 2/1995 | Corcoran | G01B 3/1061 | 242/394.1 |
| 5,440,820 A | 8/1995 | Hwang | | |
| 5,448,837 A * | 9/1995 | Han-Teng | G01B 3/1005 | 33/761 |
| 5,471,761 A * | 12/1995 | Cheng | G01B 3/1005 | 33/755 |
| 5,718,056 A * | 2/1998 | Miyasaka | G01B 3/1005 | 242/395.1 |
| 5,743,021 A * | 4/1998 | Corcoran | G01B 3/1005 | 33/762 |
| 5,768,797 A | 6/1998 | Trevino | | |
| 5,820,057 A * | 10/1998 | Decarolis | B65H 75/486 | 242/375.3 |
| 5,875,987 A * | 3/1999 | Pullen | G01B 3/1005 | 242/379 |
| 5,894,678 A * | 4/1999 | Masreliez | G01B 3/1061 | 324/207.24 |
| 6,016,609 A * | 1/2000 | Donovan | B65H 75/4402 | 254/134.3 FT |
| 6,295,740 B1 | 10/2001 | Mitchell | | |
| 6,349,482 B1 * | 2/2002 | Gilliam | G01B 3/1005 | 33/755 |
| RE37,824 E | 9/2002 | Pullen | | |
| 6,615,504 B2 | 9/2003 | Oser | | |
| 6,643,947 B2 | 11/2003 | Murray | | |
| 6,658,755 B2 * | 12/2003 | Arlinsky | G01B 3/1041 | 33/1 PT |
| 6,766,588 B1 * | 7/2004 | Hsu | G01B 3/1005 | 242/375 |
| 6,811,109 B1 * | 11/2004 | Blackman | G01B 3/1005 | 242/375 |
| 6,868,620 B2 * | 3/2005 | Sanoner | G01B 3/11 | 33/756 |
| 6,994,289 B2 * | 2/2006 | Liao | G01B 3/1041 | 242/376.1 |
| 7,024,790 B1 * | 4/2006 | Qilian | G01B 3/1005 | 242/375.3 |
| 7,103,988 B2 * | 9/2006 | Sanoner | G01B 3/11 | 33/756 |
| 7,284,339 B1 * | 10/2007 | Campbell | G01B 3/1005 | 242/390.8 |
| 7,293,367 B1 | 11/2007 | Zhu et al. | | |
| 7,377,050 B2 * | 5/2008 | Shute | G01B 3/1041 | 33/761 |
| 7,398,604 B2 | 7/2008 | Murray | | |
| 7,415,777 B2 * | 8/2008 | Campbell | G01B 3/1005 | 242/390.8 |
| 7,451,552 B2 * | 11/2008 | Haglof | G01B 3/1041 | 33/756 |
| 7,458,537 B2 * | 12/2008 | Critelli | G01B 3/1005 | 242/376 |
| 7,475,842 B2 | 1/2009 | Campbell | | |
| 7,559,154 B2 | 7/2009 | Levine et al. | | |
| 7,600,327 B2 * | 10/2009 | Sharp | G01B 3/1005 | 242/390 |
| 8,336,688 B2 * | 12/2012 | Chen | B65H 75/4434 | 191/12.2 A |
| 8,739,426 B1 * | 6/2014 | Freed | G01B 3/10 | 33/413 |
| 8,793,890 B2 | 8/2014 | Delneo et al. | | |
| 9,207,058 B2 * | 12/2015 | Delneo | G01B 3/1041 | |
| 9,663,322 B2 * | 5/2017 | Tracey | B65H 75/403 | |
| 9,874,428 B1 * | 1/2018 | Nelson | G01B 3/1005 | |
| 2014/0075772 A1 | 3/2014 | Delneo et al. | | |
| 2017/0082413 A1 * | 3/2017 | Park | G01B 3/1041 | |
| 2018/0245903 A1 * | 8/2018 | McKinster | G01B 3/1005 | |

\* cited by examiner

HYBRID SPRING AND ELECTRIC MOTOR TAPE RULE

FIELD OF THE INVENTION

The present invention relates to tape rules, and more particularly to tape rules in which the extension of a length of tape from the tape rule housing and/or retraction of the tape into the tape rule housing is facilitated by a combination of an electric motor and a retraction spring, and/or by an electric motor that is selectively activated based on torque or force being exerted on a tape reel.

DESCRIPTION OF THE RELATED ART

As used herein, the term "tape rule" includes, e.g., any mechanism for storing and extending a length of tape or the like, whether or not gradations or other indicia of length are marked on the tape. As used herein, "tape" includes tape, fabric, metal (also referred to as a "blade"), surveyor's tape, line, wire, chain, rope, and any other medium or windable material which may be wrapped or otherwise wound around a spool.

Some tape rules may wrap or otherwise wind a length of tape around an outer spool (also referred to as a "reel") so that a length of tape is extendable through a tape exit formed in a tape rule housing. The reel may be rotatably disposed in the housing concentrically about a non-rotatable inner spool or spindle (also referred to as "hub"), around which is wrapped several turns of a retraction spring. Examples of such tape rules are shown in U.S. Pat. No. 6,643,947, issued Nov. 11, 2003 to Murray, and in U.S. Pat. No. 8,793,890, issued Aug. 5, 2014 to Delneo et al., the disclosures of which are hereby incorporated herein by reference in their entireties.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a tape rule having a housing, a hub, a reel, a tape, a spring, and a motor. The hub and reel are rotatably mounted within the housing. The tape is wound around the reel. The spring is wound around the hub and is attached to at least one of the reel and the tape. The motor is disposed adjacent to the hub and is configured, when activated, to rotate the hub to adjust an amount by which the spring is wound around the hub.

In an embodiment, the amount by which the spring is wound around the hub is configured to increase as the tape is extracted from the housing, and the motor is configured, when activated, to rotate the hub in a direction that unwinds the spring relative to the hub to decrease the amount by which the spring is wound around the hub.

In an embodiment, the tape rule is configured, during extraction of the tape from the housing, to determine a parameter value indicative of the amount by which the spring is wound around the hub, to determine whether the parameter value has reached or exceeds a defined threshold, and in response to a determination that the parameter value has reached or exceeds the defined threshold, activate the motor to unwind the spring relative to the hub.

In an embodiment, the parameter value is a value of a force or torque exerted by the spring on the hub, or is a value of a length of the tape that has been extracted from the housing.

In an embodiment, the tape rule further comprises a torque sensor disposed between the motor and the hub, wherein the hub is connected to the motor via the torque sensor, and wherein the tape rule is configured to determine the value of the force or torque based on a measurement from the torque sensor.

In an embodiment, the tape rule comprises a battery, and the motor is configured to draw current from the battery to maintain the hub in a substantially rotationally fixed state relative to the motor as the tape is extracted from the housing. In this embodiment, the tape rule is configured to determine the value of the force or torque by: determining an amount of the current being drawn by the motor from the battery to maintain the hub in the substantially rotationally fixed state as the tape is extracted from the housing, and determining the value of the force or torque based on the amount of the current being drawn by the motor to maintain the hub in the substantially rotationally fixed state.

In an embodiment, the tape rule is further configured, after activating the motor to unwind the spring, to determine whether the parameter value has fallen below the defined threshold by at least a defined buffer amount, and in response to a determination that the parameter value has fallen below the defined threshold by at least the defined buffer amount, to deactivate the motor.

In an embodiment, the defined threshold corresponds to the spring being in a fully wound state in which the spring is substantially non-compressible.

In an embodiment, the defined threshold is reached when less than half of a total length of the tape has been extracted from the housing.

In an embodiment, the amount by which the spring is wound around the hub is configured to decrease as the tape is retracted into the housing, and wherein the motor is configured, when activated, to rotate the hub in a direction that winds the spring relative to the hub to increase the amount by which the spring is wound around the hub.

In an embodiment, the tape rule is further configured, during retraction of the tape into the housing: to determine a parameter value indicative of the amount by which the spring is wound around the hub, to determine whether the parameter value has reached or fallen below a defined threshold, and in response to a determination that the parameter value has reached or fallen below the defined threshold, activate the motor to wind the spring relative to the hub, and in response to a determination that the parameter value has subsequently risen above the defined threshold by at least a defined buffer amount, to deactivate the motor.

In an embodiment, the tape rule is configured to determine a parameter value indicative of the amount by which the spring is wound around the hub, and is configured, after the parameter value has reached or exceeded a first defined threshold, to maintain the parameter value in a range between the first defined threshold and a second defined threshold lower than the first defined threshold by causing the motor to rotate the hub in a first direction to unwind the spring or by causing the motor to rotate the hub in a second direction to wind the spring to adjust the parameter value.

In an embodiment, the tape rule further comprises a clutch disposed between the motor and the hub, wherein the clutch is configured to selectively disengage the motor from the hub based on a value of a force or torque exerted by the hub on the motor.

In an embodiment, the tape rule further comprises a user input element disposed on or in the housing and configured to receive a user input, wherein the tape rule is configured to activate the motor in response to the user input element receiving the user input.

In an embodiment, during retraction of tape into the housing, the spring is configured to exert a force or torque on the reel or on the tape in a second direction, and wherein the tape rule has a mode that, when pre-set or manually activated, causes the tape rule to activate the motor to rotate the hub in a first and opposite direction to reduce the force or torque exerted by the spring on the reel or on the tape during at least part of the retraction of the tape into the housing.

In an embodiment, the mode is an auto slow-down mode that, when pre-set or manually activated, causes the tape rule to determine whether a parameter value indicative of the force or torque being applied by the spring on the reel or tape has reached or exceeds a defined threshold, and wherein the motor is activated to rotate the hub in the first direction during the retraction of the tape in response to a determination that the parameter value has reached or exceeds the defined threshold.

One aspect of the embodiments herein relate to a tape rule that includes a housing, a reel, a tape, and a motor. The reel is rotatably mounted within the housing, and the tape is wound around the reel. The motor is connected to the reel, wherein the tape is configured to exert a force or torque on the reel during extraction of the tape from the housing. The tape rule is configured to determine whether the force or torque exerted by the tape on the reel has reached or exceeds a defined threshold, and in response to a determination that the force or torque exerted by the tape on the reel has reached or exceeds the defined threshold, to activate the motor to output rotation to reduce the force or torque exerted by the tape on the reel.

In an embodiment, the force or torque exerted by the tape on the reel causes or will cause the reel to rotate in a first direction, and wherein the motor, when activated, is also configured to rotate the reel in the first direction.

In an embodiment, the tape rule further comprises a torque sensor disposed adjacent to the reel or to the motor and configured to measure a torque being exerted by the tape on the reel.

In an embodiment, the tape rule is configured to activate the motor in a second and opposite direction to retract the tape into the housing.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1A:
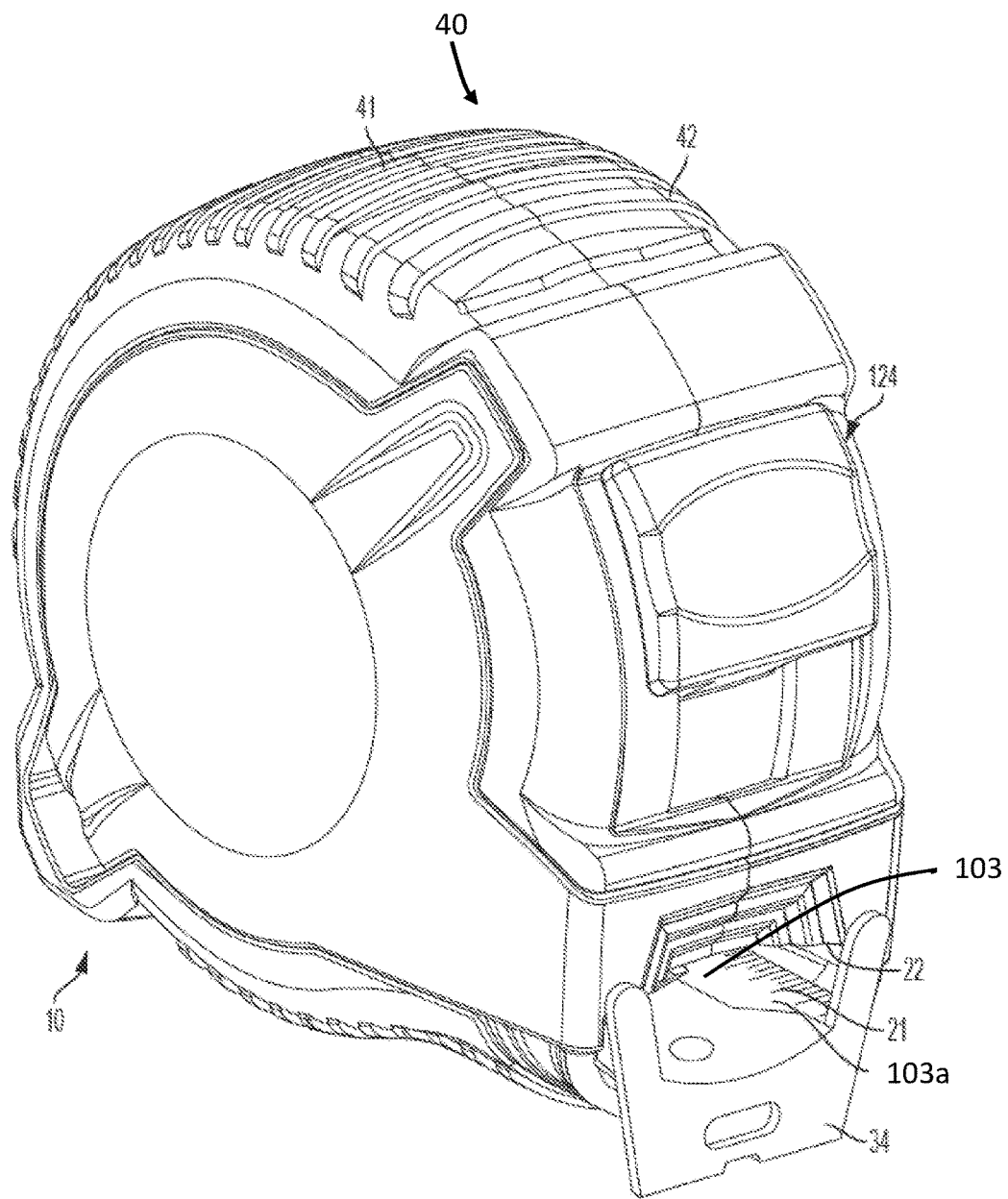
FIG. 1A is a perspective view of an embodiment of a tape rule, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a tape rule that facilitates extraction and/or retraction of tape with a motor (e.g., an electric motor). Some embodiments herein relate to a hybrid spring-and-electric-motor tape rule that combines a retraction spring, which lets out tape from a housing and provides mechanical energy to retract the tape into the housing, and a motor that is able to wind and/or unwind the retraction spring. For instance, the retraction spring may be a spiral spring or coil spring that is wound around a hub, and the motor may be configured to rotate the hub to wind or unwind the spring relative to the hub. In an embodiment, the spring may be any device that is configured to store potential energy during extraction of tape from the housing of the tape rule, and that is configured use the potential energy to retract the tape into the housing. In an embodiment, the motor may be any actuator that is configured to output rotational movement with the input of electrical energy (e.g., electrical current), with or without, e.g., gears, pulleys, clutches, or sprockets. In an embodiment, the motor may be a brushed or brushless motor.

In some cases, when tape is initially being extracted from the housing, the retraction spring may be used to let out the tape, and the motor may be in a deactivated state (e.g., a state in which the motor is not being activated to output rotation). The motor may be activated when a certain condition is satisfied, such as a torque or force being exerted by the retraction spring on the hub reaching or exceeding a defined threshold. The motor may be activated to rotate the hub in a first direction that unwinds the spring relative to the hub.

The rotation causes the retraction spring to be wound less tightly around the hub, which may facilitate extraction of more tape from the housing. A more detailed discussion of the activated state and the deactivated state of the motor is provided later in the disclosure.

In some cases, when tape is initially being retracted into the housing, tension from the retraction spring may be used to retract the tape, and the motor may be in a deactivated state. The motor may be activated when another condition is satisfied, such as the torque or force being exerted by the retraction spring on the hub reaching or falling below another defined threshold. The motor may be activated to rotate the hub in a second direction that winds the retraction spring relative to the hub. The rotation causes the retraction spring to be wound more tightly around the hub, which facilitates retraction of more tape into the housing. The use of the motor in the motor-and-retraction-spring combination may reduce an amount of spring needed to let out or retract tape of the tape rule, while the use of the retraction spring may provide a reaction buffer for the motor to activate, allowing the motor to activate or deactivate in a manner that is automatic or otherwise invisible to an end user (though in some embodiments the motor can be manually activated).

Some embodiments herein include a motor that is activated based on a parameter value such as an amount of force or torque being exerted by a tape of a tape rule on a reel of the tape rule. Such embodiments may include a spring to let out and retract the tape, or may omit such a spring. The torque or force may come from a user pulling on one end of the tape, and may be transferred from the tape to the reel. The motor may be activated when, e.g., the force or torque on the reel reaches or exceeds a defined threshold.

FIG. 1A illustrates an exterior perspective view of a tape rule 10 according to an embodiment hereof. The tape rule 10 includes a housing 40 that is formed by at least housing member 41 and housing member 42. In an embodiment, the housing members 41, 42 may form of two discrete structures (e.g., two clamshell halves) that are secured together by fasteners, snap fitting, adhesive, or any other fastening mechanism. The housing 40 may house a length of tape 103, which may be extracted from the housing 40 and retracted back into the housing 40. In an embodiment, the tape 103 may be any windable material (e.g., a ribbon, line, cable, or rope) that can be wrapped around a spool. In some instances, the tape 103 is arranged to carry or display gradations 21 (e.g., lines) that have been applied to a surface thereof, by any manner. The gradations 21 may be applied to the surface of the tape by, e.g., paint, etching, stenciling, or a combination thereof. The gradations 21 may be used with other measuring indicia (e.g., numbers printed on the tape 103) for measuring lengths and distances. In an embodiment, the tape 103 is formed of a ribbon of metal or metal alloy (e.g., steel) or other material.

FIG. 1A illustrates the tape 103 in a fully retracted position. A first longitudinal end 103a of the tape 103 may be attached to a hook member 34. A second and opposite longitudinal end of the tape 103 may be attached to a reel 109 (illustrated in FIG. 1B) inside the housing 40. The tape 103 may be constructed and arranged to extend generally from a position tangential of the reel 109 outwardly from a spaced opening 22 provided in the housing 40. The tape 103 may be movable between a fully retracted position (e.g., in which substantially all of the tape 103 is in the housing 40) and a fully extracted position (e.g., in which substantially all of the tape 103 has been extracted from the housing 40). The extraction of the tape 103 may cause the reel 109 to rotate in a first direction, while rotation of the reel 109 in a second and opposite direction causes the tape 103 to be retracted into the housing 40. In an embodiment, when the tape 103 is in a partially or fully extracted state, a holding assembly 124 may be manually actuated to hold the tape 103 in that state. In an embodiment, the tape 103 may have a flat cross-section when it is wound around the reel 109, and have a concavo-convex cross section when it is extracted from the housing 40. The concavo-convex cross section may provide the tape 103 with additional rigidity that maintains the tape 103 in a substantially straight shape in a longitudinal direction when the tape 103 has been extracted from the housing 40.

Figure 1B:
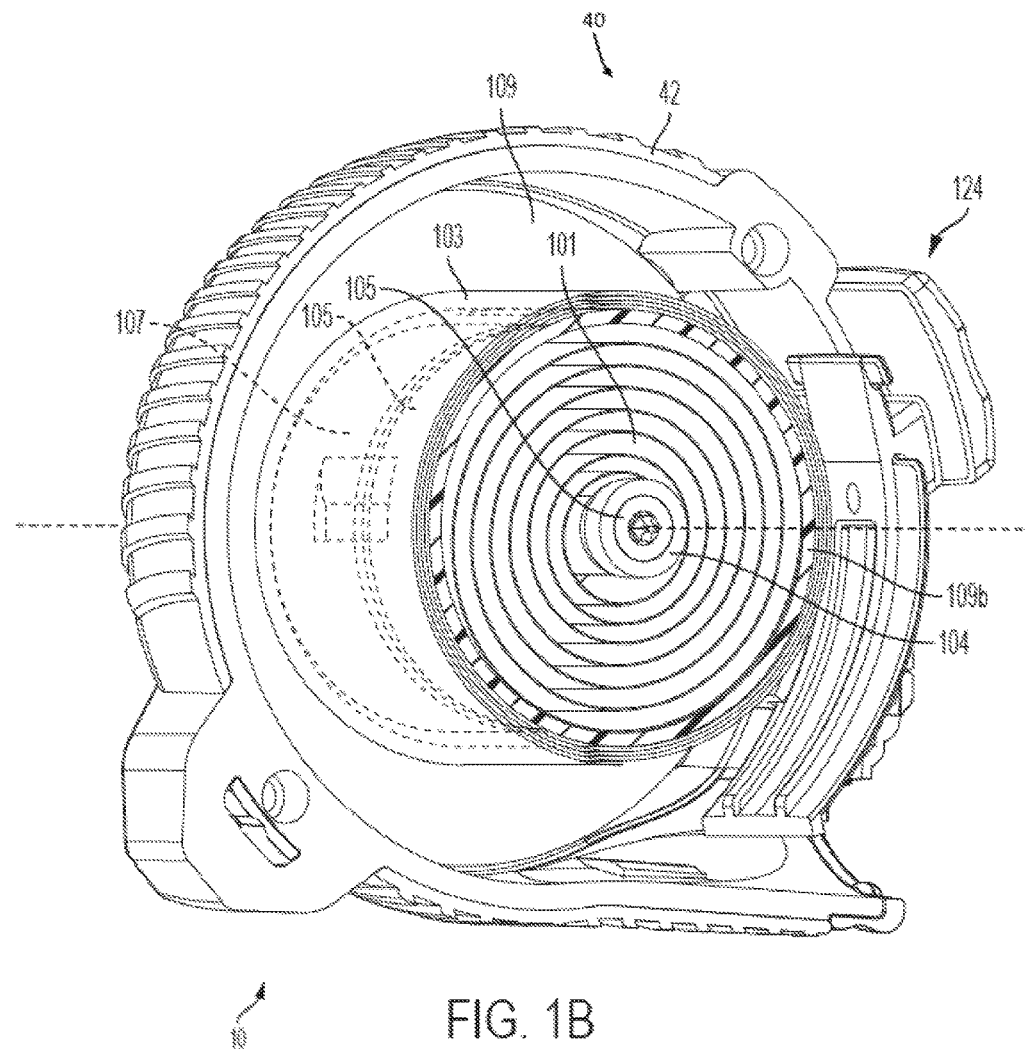
FIG. 1B is a perspective view of various components of the tape rule of FIG. 1A, according to an embodiment hereof.
Figure 1C:
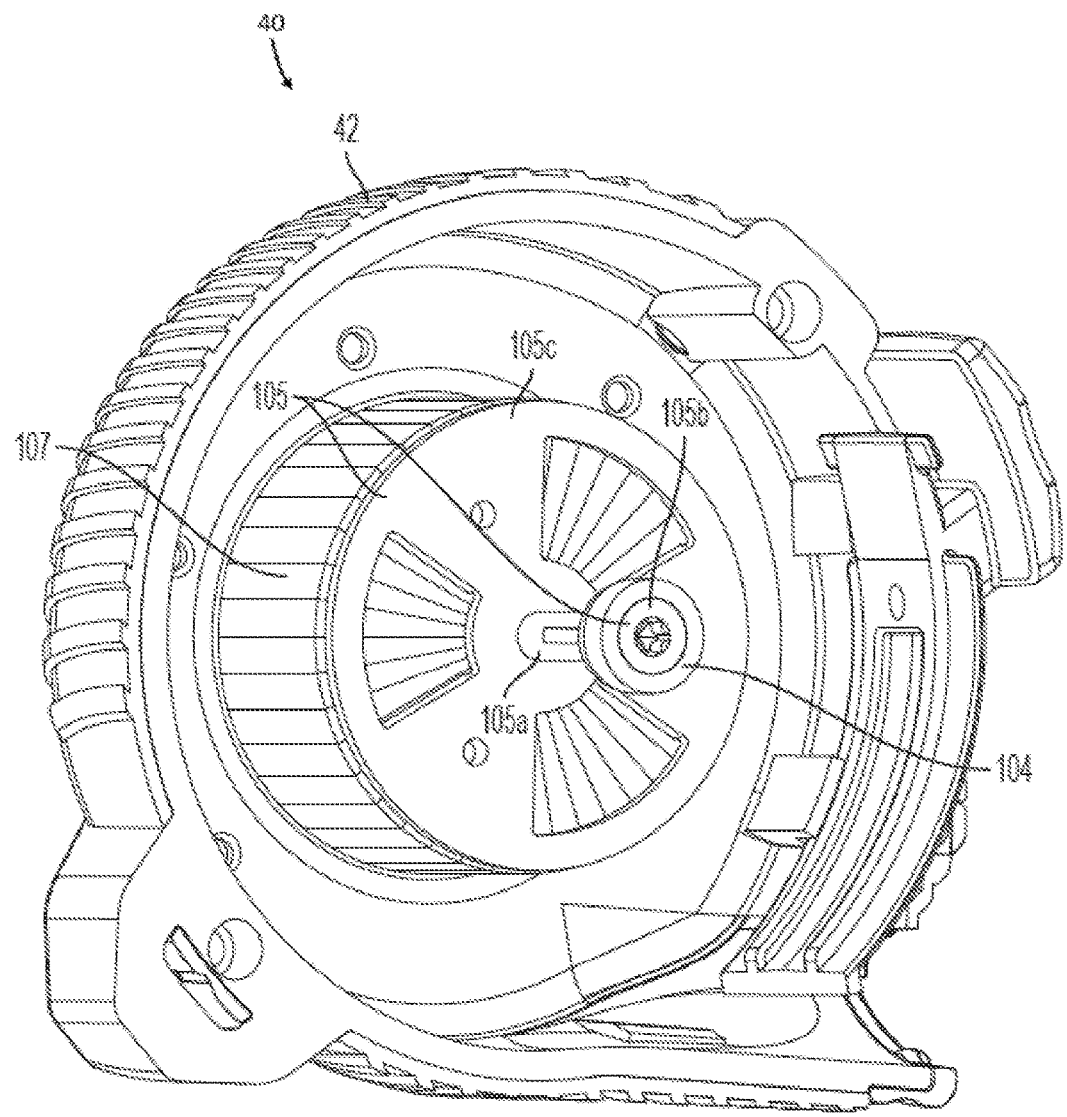
FIG. 1C is a perspective view of various components of the tape rule of FIG. 1A, according to an embodiment hereof.
Figure 1D:
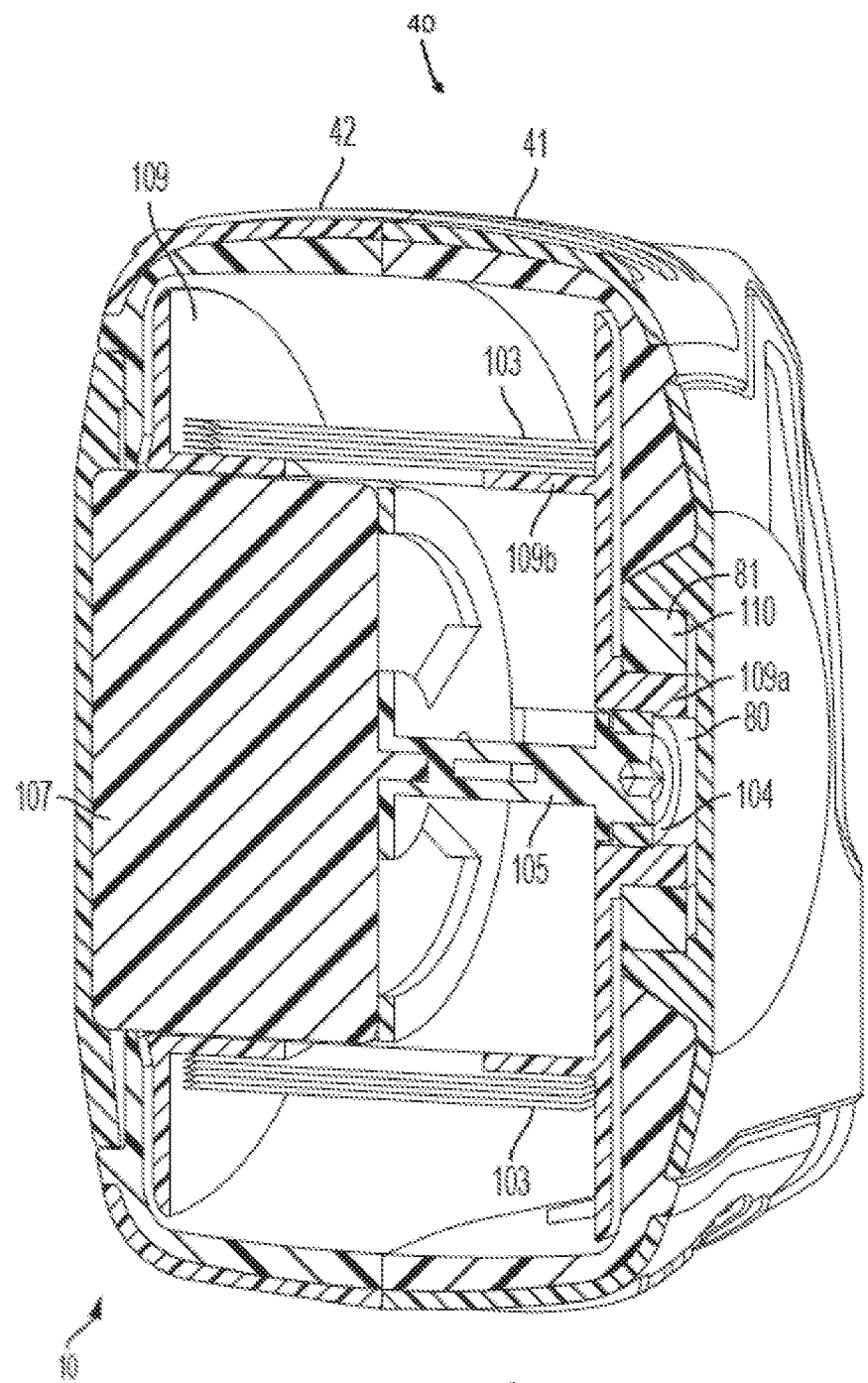
FIG. 1D is a sectional view of the tape rule of FIG. 1A, according to an embodiment hereof.

FIGS. 1B-1D provide perspective or sectional views that depicts various tape rule components housed in the housing 40 of the tape rule 10. As discussed below in more detail, the components may include a retraction spring and a motor, and may form a hybrid spring-and-electric-motor tape rule. More generally speaking, FIGS. 1B-1D illustrate the reel 109, the tape 103, a spring 101, a hub 105, and a motor 107 of the tape rule 10.

As illustrated in FIGS. 1B and 1D, the reel 109 may include a protruding portion 109a (see, e.g., FIG. 1D) or a pair of protruding portions used for suspending or otherwise mounting the reel 109 in the housing 40, and a spool portion 109b on which the tape 103 is wound. The spool portion 109b may, for instance, provide a cylindrical structure on which the tape 103 is wound. In an embodiment, a part of the spool portion 109b may be clipped, pinned, or otherwise connected to the spring 101 and/or the tape 103, such as to a second end of the tape 103 that is opposite to the first end 103a. In another embodiment, the reel 109 may be directly or indirectly connected to the spring 101 via an adhesive. In an embodiment, as illustrated in FIG. 1D, the reel 109 may be rotatably mounted in the housing 40 via the protruding portion 109a and a reel bearing 110. The reel bearing 110 may be, e.g., a plain bearing or ball bearing that fits around the protruding portion 109a. In an embodiment, the protruding portion 109a and the reel bearing 110 may be received in a receptacle portion 81 (e.g., a recess) of the housing member 41. The reel bearing 110 rotatably mounts the reel 109 within the housing 40, and enables the reel 109 to rotate relative to the housing 40. In an embodiment, the reel 109 may be symmetrical, such that the reel has the protruding portion 109a on a first side (e.g., right side) of the spool portion 109b, and a second protruding portion on a second and opposite side (e.g., left side) of the spool portion 109b. In such an embodiment, the second protruding portion of the reel 109 may also be surrounded by a respective reel bearing, and the second protruding portion and the respective reel bearing may be received in a receptacle portion of the housing member 42. In an embodiment, the reel 109 may be made of, e.g., molded plastic, metal, or any other material.

Referring again to FIG. 1B, the reel 109 may be connected to a spring 101 at a first end thereof. The spring 101 may be connected to a hub 105 at a second end thereof, and may be wound around the hub 105. In an embodiment, the spring 101 may be located within the spool portion 109b of the reel 109, such that the reel 109 partially or completely encloses the spring 101. During extraction of the tape 103 from the housing 40, a first end 103a of the tape 103 may be pulled, such as by a user, from the housing 40. The pulling force may be transferred to the reel 109, which causes the reel 109 to rotate. The rotation of the reel 109 may wind the spring 101 more tightly around the hub 105, as discussed in more detail below. In an embodiment, the spring 101 may be a spiral torsion spring or coil spring that is wound around the hub 105. As the spring 101 is wound around the hub 105 in a first direction, the spring 101 may store potential energy. For instance, as the spring 101 is wound more tightly around the hub 105, the spring 101 may become more compressed, causing a distance between successive turns (also referred to as successive coils) of the spring 101 to decrease. The compression of the spring 101 may store potential energy therein. When the potential energy is released, the spring 101 may unwind and rotate the reel 109 in an opposite direction that retracts the tape 103 into the housing 40. In an embodiment, the spring 101 may be formed from spring steel or any other material.

As stated above, the spring 101 may in an embodiment be wound around the hub 105. As depicted in FIG. 1C, the hub 105 may have an axial member 105a that forms a rotatable axle, a first end 105b used for mounting the hub 105 in the housing 40, and a second end 105c that forms a disc portion of the hub 105. In an embodiment, the spring 101 may be connected to and wound around the axial member 105a. In an embodiment, the first end 105a of the hub 105 may form a flanged portion that is surrounded by a hub bearing 104 (e.g., a plain bearing or ball bearing). As depicted in FIG. 1D, the first end 105a and the hub bearing 104 may be received in a receptacle portion 80 that is formed by a recess in the protruding portion 109a of the reel 109. The hub bearing 104 rotatably mounts the hub 105 within the housing 40 and within the reel 109, and allows the hub 105 and the reel 109 to be rotatable relative to each other.

As illustrated in FIGS. 1C and 1D, a motor 107 (e.g., a DC motor) may be disposed adjacent to the hub 105, at the second end 105c thereof, and is combined with the spring 101 to form a hybrid spring-and-electric-motor tape rule. As illustrated in FIG. 1D, the motor 107, hub 105, and spring 101 may be disposed within the spool portion 109b of the reel 109. In an embodiment, a battery may be disposed adjacent to the motor 107. In an embodiment, as depicted in FIG. 1D, a shaft (more generally referred to as a rotor) of the motor 107 may be directly connected to the hub 105. In another embodiment, the shaft of the motor 107 may be indirectly connected to the hub 105 via a gearbox (also referred to as a gear train) disposed between the motor 107 and the hub 105. In an embodiment, the motor 107 may be indirectly connected to the hub 105 via a torque sensor and/or a clutch, as discussed below in more detail.

In an embodiment, the motor 107 may be configured, when activated, to rotate the hub 105 relative to the motor 107. In other words, the activated state for the motor may refer to a state in which the motor 107 draws power (e.g., from a battery) to rotate the hub 105 relative to the motor 107 (also referred to as outputting rotation on the hub 105). For instance, the motor 107 may have a stator and a rotor, and when activated may cause the rotor to rotate relative to the stator. The rotor may in some instances be rotationally coupled to the hub 105 so that they rotate together. In such instances, the hub 105 may be rotated relative to the stator when the motor 107 is activated. The motor 107 may be activated to rotate the hub 105 in a first direction that unwinds the spring 101 relative to the hub 105, and/or may be activated to rotate the hub 105 in a second and opposite direction to wind the spring 101 relative to the hub 105. In an embodiment, the hub bearing 104 that is situated between the hub 105 and the reel 109 may allow the motor 107 to rotate the hub 105 without rotating the reel 109.

In an embodiment, the deactivated state for the motor 107 may refer to a state in which the hub 105 is not rotating relative to the motor 107, and/or a state in which the motor 107 is not drawing power from a battery or other power source of the tape rule 10. For instance, the deactivated state may include a situation in which the motor 107 attempts to maintain the hub 105 in a substantially rotationally fixed state relative to the motor 107 (e.g., the hub 105 rotates by less than 0.5°, if at all, relative to the motor 107) during extraction or retraction of the tape 103. In some cases, if the motor 107 has a stator and rotor, the motor 107 may maintain the substantially rotationally fixed state for the hub 105 by keeping rotor substantially rotationally fixed relative to the stator. To maintain the substantially rotationally fixed state for the hub 105, the motor 107 may need to counteract a force or torque on the hub 105 that arises from a user pulling on the tape 103 during extraction of the tape. This pulling force from the user may be transferred to the spring 101 and cause the spring 101 to be more wound around the hub 105 and exert an increased amount of force or torque on the hub 105 (e.g., a force or torque in a clockwise direction). The motor 107 may be used to provide an equal amount of counteracting force or torque in an opposite direction (corresponding to, e.g., a counterclockwise direction) to substantially prevent rotation of the hub 105 relative to the motor 107. The amount of counteracting force or torque may depend on how much current the motor 107 draws from a battery or other power source. In an embodiment, a first current sensor may measure an amount of current that the motor 107 is drawing from the battery to counteract the force or torque being exerted by the spring 101 on the hub 105. The amount of force or torque exerted by the spring 101 on the hub 105 may then be determined based on the amount of current being drawn by the motor 107 to counteract that force or torque.

As discussed above, the deactivated state may include a situation in which the motor 107 is not drawing current from the battery, such as when the motor 107 is electrically disconnected from the battery or other power source. In some instances, the motor 107 may be braked, such as by electrically shorting a positive and a negative terminal of the motor 107. In some instances, a braking mechanism may maintain the hub 105 in the substantially rotationally fixed state until the motor 107 is activated. In other instances, the hub 105 may be allowed to rotate during extraction or retraction of the tape 103. For example, when a user is pulling on the tape 103 during extraction thereof, the pulling force may be transferred to the spring 101 and cause the hub 105 to rotate. In this example, rather than counteract the pulling force to prevent rotation of the hub 105, the motor 107 may act as a generator that generates a current from the rotation of the hub 105. More specifically, if the motor 107 has a stator and rotor, the rotation of the hub 105 may cause the rotor to rotate relative to the stator, and generate a current. In some instances, the motor 107 may be electrically disconnected from a battery or other power source of the tape rule 10 while the motor 107 is acting as a generator. The first current sensor or a different current sensor (e.g., a sensor placed in an electrically shorted path from a positive terminal to a negative terminal of the motor 107) may measure an amount of current being generated by the motor 107, and determine the amount of force or torque being exerted on the hub 105 (e.g., by the spring 101) based on the amount of current being generated by the motor 107.

In an embodiment, the braking mechanism may be provided by the motor 107 itself, and/or by a separate braking mechanism. The braking mechanism may be provided by the motor 107 itself by electrically shorting a positive terminal and a negative terminal of the motor 107. A separate braking mechanism may be provided by, e.g., a brake pad that engages the hub 105 when braking is needed, and that disengages the hub 105 when the motor 107 is activated.

As discussed above, the spring 101 may be wound around the hub 105. As a result, the spring 101 may exert a force or torque on the hub 105. When the tape 103 is being extracted from the housing 40, the spring 101 may become more tightly wound around the hub 105. As a result, the force or torque exerted by the spring 101 on the hub 105 may increase. FIG. 1D depicts an embodiment in which the motor 107 may be used to determine a value of the force or torque being exerted by the spring 101 on the hub 105. More specifically, as discussed above, when a user is pulling on the tape 103, the pulling force may be transferred by the spring 101 onto the hub 105, in the form of a force or torque on the hub 105. The motor 107 may in some instances provide a counteracting force or torque on the hub 105 to keep the hub 105 substantially rotationally fixed during this extraction of the tape 103. The amount of counteracting force or torque provided by the motor 107 may be based on an amount of current being drawn by the motor 107 from a battery (or other power source). Because this counteracting force or torque is generally equal to the force or torque exerted by the spring 101 on the hub 105, the latter force or torque may be determined based on the amount of current drawn by the motor 107 from the battery. In another embodiment, the motor 107 may be electrically disconnected from the battery and may act as a generator. In this embodiment, the force exerted by the user during extraction of the tape 103 may be transferred to the hub 105 via the spring 101, which may cause both the hub 105 and a portion of the motor 107 to be rotated. The motor 107 may generate a current as a result. The force or torque being exerted by the spring 101 on the hub 105 may then be determined based on an amount of current being generated by the motor 107 in this configuration. Thus, the embodiment of FIG. 1D may use at least one of the implementations discussed above to determine torque or force exerted on the hub 105, and may omit the use of a separate torque sensor (i.e., the force or torque may be determined without a separate torque sensor).

Figure 1E:
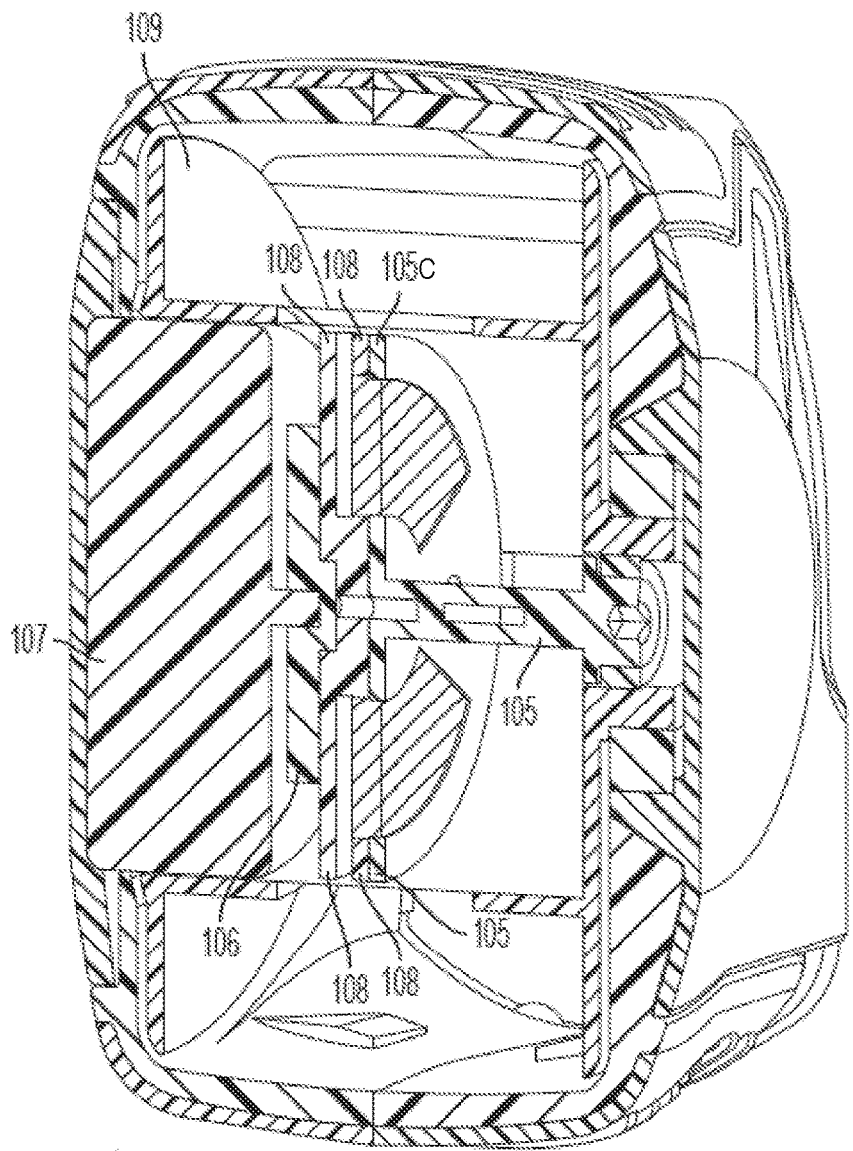
FIG. 1E is a sectional view of a tape rule, according to an embodiment hereof.

FIG. 1E illustrates another embodiment of a tape rule 10A that does include a separate torque sensor 106 (e.g., a rotary torsion sensor or a reaction torsion sensor) to determine the torque or force being exerted by the spring 101 on the hub 105. The torque sensor 106 may be disposed between the motor 107 and the hub 105. In this embodiment, the motor 107 may be indirectly connected to the hub 105 via the torque sensor 106. This embodiment may include a gearbox disposed between the torque sensor 106 and the motor 107, or between the torque sensor 106 and the hub 105, or may omit such a gearbox.

As discussed below, the value of the force or torque on the hub 105 may be a parameter value indicative of an amount by which the spring 101 is wound around the hub 105, but other parameters may also indicate the amount by which the spring 101 is wound around the hub. For instance, the amount of tape 103 (e.g., in units of feet or number of revolutions of the reel 109) that has been let out by the spring 101 may also indicate the amount by which the spring 101 is wound around the hub. Thus, in an embodiment, the tape rule 10A of FIG. 1E may combine or replace the torque sensor 106 with another sensor configured to measure a parameter value indicative of an amount by which the spring 101 is wound around the hub 105, such as a sensor configured to directly measure how much of the tape 103 has been extracted from the housing 40 (e.g., by directly measuring how many revolutions the reel 109 has rotated).

In the embodiment of FIG. 1E, the tape rule 10A may include a clutch 108 disposed between the hub 105 and the motor 107, and more specifically between the torque sensor 106 and the hub 105. The clutch 108 may be configured to protect the torque sensor 106 and the motor 107 from damage when, for instance, there is a sudden spike in the torque being exerted on the hub 105 or, more generally speaking, when a rate of increase in the torque being exerted on the hub 105 reaches or exceeds a defined threshold (e.g., in units of lb-force inches (lbf-in) per second). When there is such a spike in torque, the clutch 108 may cause the hub 105 to disengage with the torque sensor 106 and the motor 107, such that the spike in the torque is not transferred to the sensor 106 and the motor 107. When the spike in torque has passed, the clutch 108 may re-engage the hub 105 with the torque sensor 106 and the motor 107. In the embodiment illustrated in FIG. 1E, the clutch 108 may be formed from two discs that engage each other through friction. One of the discs may be in contact with the second end 105c of the hub 105. The other of the discs may be in contact with the torque sensor 106. When there is a spike in the torque being exerted on the hub 105, the two discs of the clutch 108 may slip, thus at least partially disengaging the torque sensor 106 from the hub 105.

Figure 1F:
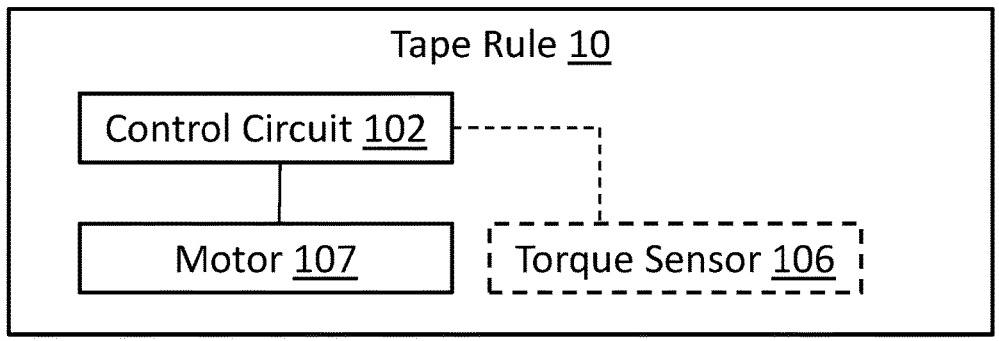
FIG. 1F is a block diagram of a tape rule, according to an embodiment hereof.

As illustrated in the block diagram of FIG. 1F, the tape rule 10 may in an embodiment comprise a control circuit 102 that is configured to selectively activate the motor 107 to rotate the hub 105 relative to the motor 107. The control circuit 102 may be, e.g., part of the motor 107, part of the torque sensor 106, or a separate component. The control circuit 102 may be implemented with a microprocessor, a programmed logic array (PLA), a field programmable gate array (FPGA), or as any other type of control circuit.

In an embodiment, the control circuit 102 may activate the motor 107, to rotate the hub 105 relative to the motor 107, based on how much of the tape 103 has been extracted from the housing 40, which may be correlated with an amount by which the spring 101 is wound around (or, more generally speaking, wound relative to) the hub 105. For instance, as more of the tape 103 is extracted from the housing 40, the tape 103 may pull on the reel 109 and cause the reel 109 to rotate, which may wind the spring 101 more tightly around the hub 105. The spring 101 may thus exert more torque or force on the hub 105 as more of the tape 103 is extracted from the housing 40.

One aspect of the embodiments herein is that the motor 107 may remain in a deactivated state, in which the hub 105 is not rotating relative to the motor 107, until a certain length of tape 103 has been extracted from the housing 40 and the spring 101 has been correspondingly wound by a sufficient amount around the hub. For instance, the motor 107 may be in a deactivated state until 10 feet or more of the tape 103 has been extracted from the housing 40. When less than 10 feet of the tape 103 has been extracted, the amount by which the spring 101 has been wound around the hub may be too low to trigger the activation of the motor 107. In such an embodiment, if the amount of tape 103 being used is less than 10 feet, the spring 101 may be used to let out and retract the tape 103 without activating the motor 107. This configuration may reduce usage of the motor 107, conserving battery life for the motor 107, and reducing wear on the motor 107. When the motor 107 does need to be activated, the spring 101 may further be used until the motor 107 accelerates to a fully activated state (e.g., in terms of output torque and/or revolutions per minute), thus providing a reaction buffer for the motor 107.

Another aspect of the embodiments herein is that the use of the motor 107 to unwind the spring 101 and/or to wind the spring 101 allows a total length of the spring 101 to be much shorter than a total length of the tape 103. More specifically, as discussed above, when the tape 103 is being extracted from the housing 40, the extraction may cause the reel 109 to rotate in a particular direction, which causes the spring 101 to be wound more tightly around the hub 105. The winding of the spring 101 around the hub 105 may cause the spring 101 to compress or otherwise elastically deform. When a certain length of the tape 103 has been extracted, the spring 101 may be compressed to a state in which, e.g., it is not further compressible or, more generally, unable to further elastically deform in the above-mentioned direction. This may occur, for instance, during a "close out" condition in which successive turns of the spring 101 are compressed to a point at which they come into contact with each other. In this condition, the spring 101 may be considered to be in a fully wound or fully compressed state. The fully wound or fully compressed spring 101 may act as a taut, rigid object that prevents the reel 109 from rotating further in the above-mentioned direction, and thus prevents more tape 103 from being extracted. Thus, without the motor 107, the spring 101 may need to have a total length that is comparable (e.g., substantially the same as) a total length of the tape 103, so that the spring 101 does not become fully wound until most or all of the tape 103 has been extracted from the housing 40. By combining the spring 101 with the motor 107, however, the spring 101 may be unwound after it reaches a fully wound state. Once the spring 101 is unwound, more of the tape 103 may be extracted. As a result, the spring 101 may have a total length (e.g., 10 feet) that is substantially shorter than a total length (e.g., 50 feet) of the tape 103.

As discussed above, the motor 107 may be used to adjust an amount by which the spring 101 is wound around the hub 105, by winding and/or unwinding the spring 101 relative to the hub 105. In an embodiment, the motor 107 may be controlled by the control circuit 102 of the tape rule 10 to both rotate the hub 105 in a first direction when the spring 101 needs to be unwound during extraction of the tape 103, and to rotate the hub 105 in a second direction when the spring 101 needs to be wound during retraction of the tape 103. In another embodiment, the motor 107 may be controlled by the control circuit 102 to rotate the hub 105 in only one direction. For instance, the motor 107 may be controlled to rotate the hub 105 in the first direction when the spring 101 needs to be unwound during extraction of the tape 103. In this instance, a different mechanism (e.g., a ratchet) may be used to retract the tape 103, thus making it unnecessary to rotate the motor 107 in the second direction during retraction of the tape 103.

Figure 1G:
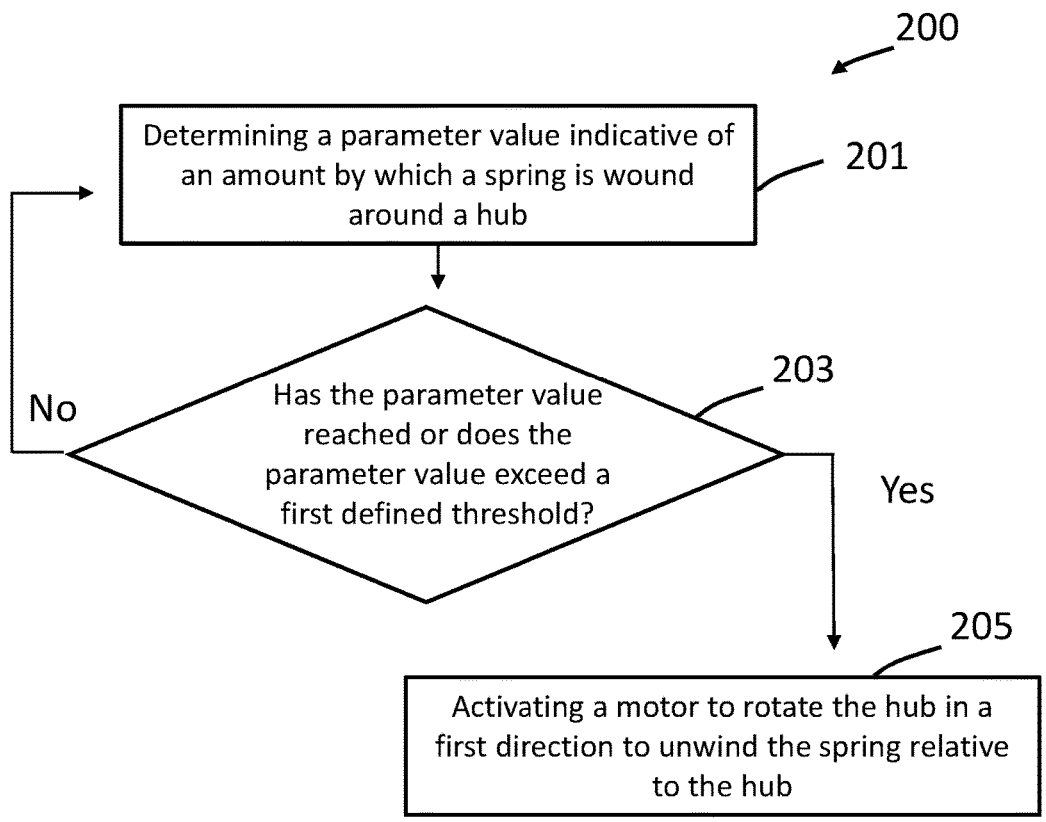
FIGS. 1G and 1H illustrate example steps performed by a control circuit of a tape rule, according to an embodiment hereof.

FIG. 1G illustrates an example method 200 by which the control circuit 102 controls the motor 107. In an embodiment, the method 200 includes a step 201, in which the control circuit 102, during extraction of the tape 103 from the housing 40 of the tape rule 10/10A, determines a parameter value indicative of an amount by which the spring 101 is wound around the hub 105. As discussed above, the parameter value may be a value of a force or torque (e.g., in lbf-in) exerted by the spring 101 on the hub 105, or a value of a length of tape 103 (e.g., in feet or number of revolutions of the reel 109) that has been extracted from the housing 40, or a value of electrical resistance (e.g., in ohms) of the motor 107 or current drawn or generated (e.g., in amps) by the motor 107, or some other parameter value indicative of an amount by which the spring 101 is wound around the hub 105. As discussed above, the control circuit 102 may determine the parameter value with a torque sensor, if it exists, or may determine the parameter value by determining an amount of current being drawn by the motor 107 in an embodiment in which the motor 107 keeps the hub 105 substantially rotationally fixed, or by determining an amount of current being generated by the motor 107 in an embodiment in which the motor 107 acts as a generator.

In step 203, the control circuit 102 may determine whether the parameter value has reached or exceeds a first defined threshold. For instance, the first defined threshold may be a force or torque threshold (e.g., 0.6 lbf-in), a threshold length of tape extracted from the housing 40 (e.g., 10 feet), or some other threshold value. In an embodiment, the defined threshold may be pre-programmed into the control circuit 102.

Figure 2A:
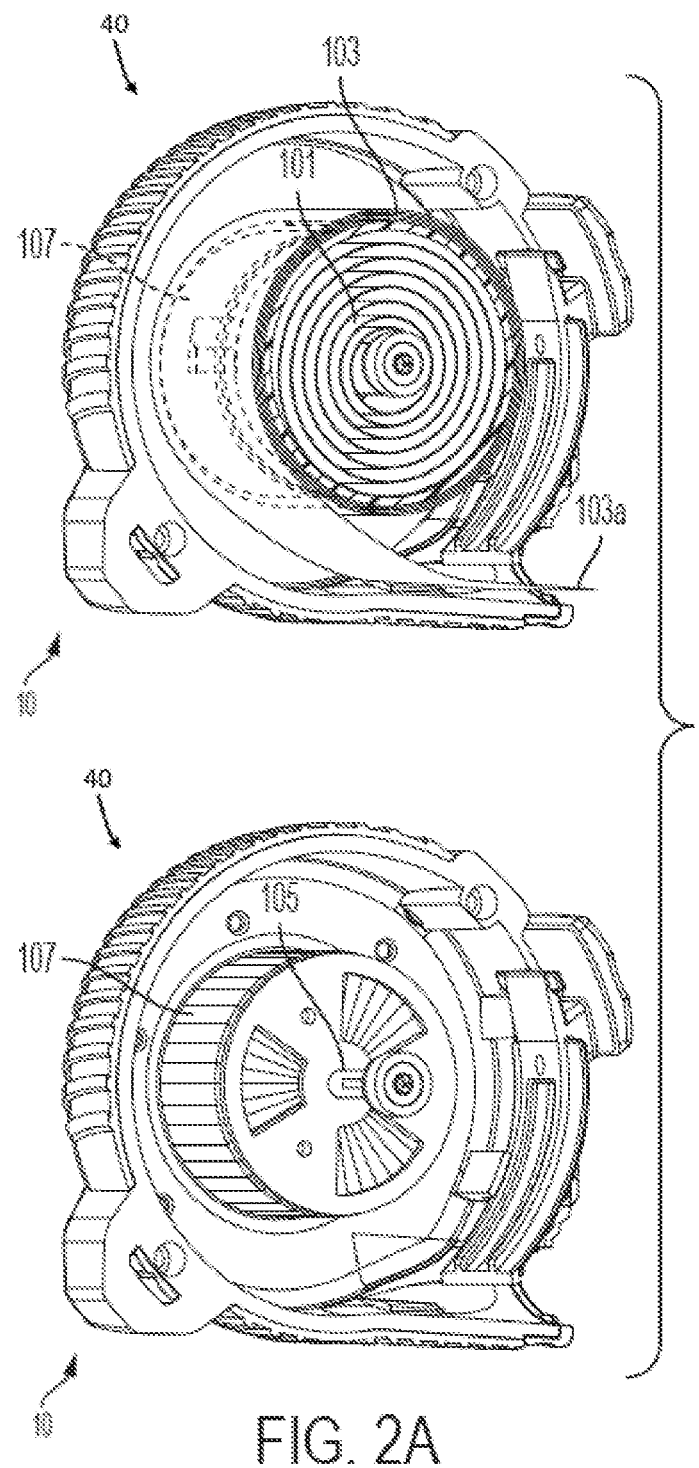
FIGS. 2A-2D are views illustrating extraction of tape from a housing of a tape rule, and/or retraction of tape into the housing of the tape rule, according to an embodiment hereof.
Figure 2B:
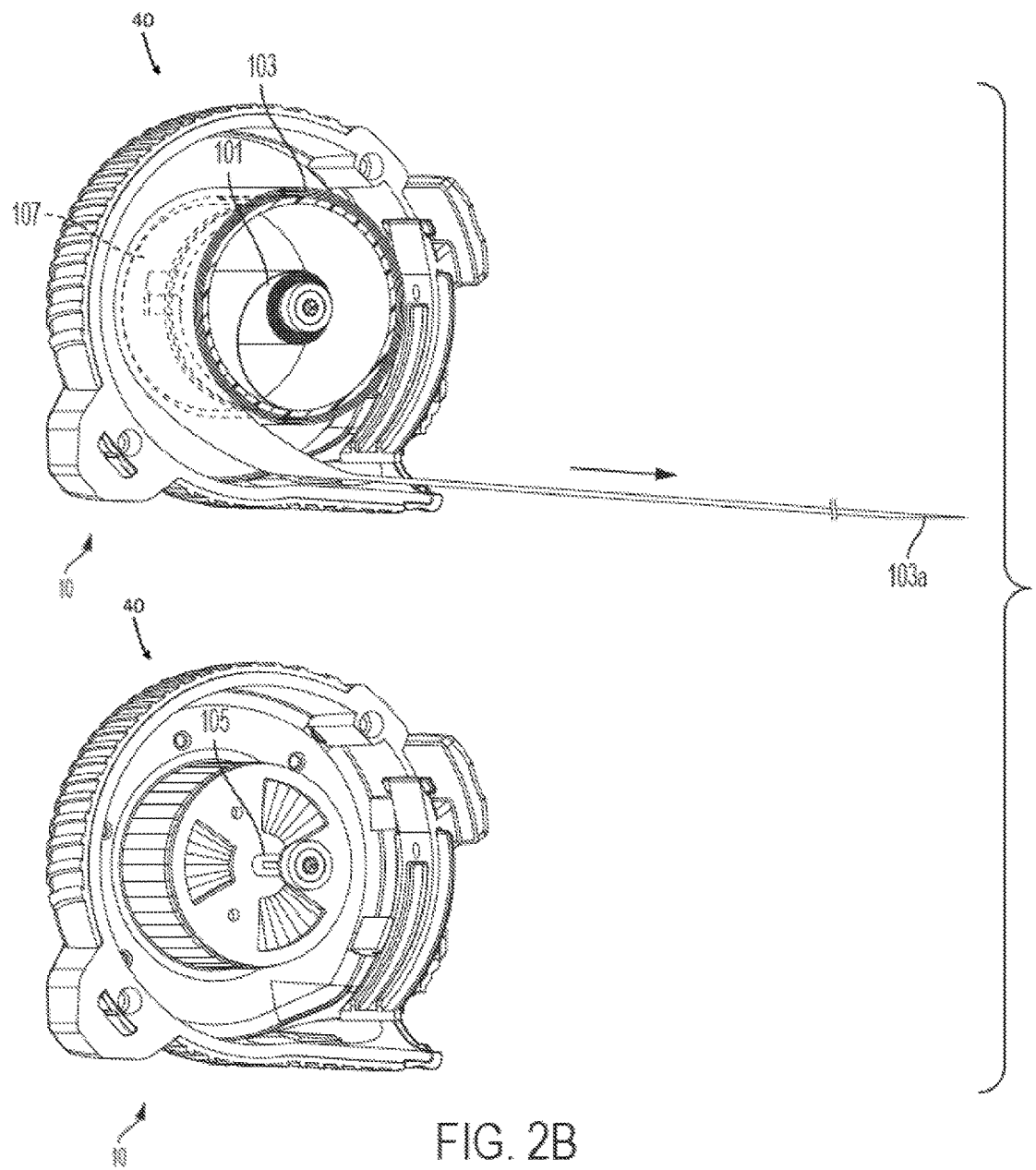

To illustrate steps 201 and 203, FIGS. 2A and 2B depict the tape rule 10 as the tape 103 is extracted from the housing 40. FIG. 2A illustrates a situation in which the tape 103 may be close to a fully retracted state. In this situation, the parameter value determined in step 201 may be relatively low (e.g., 0.21 lbf-in), and the control unit 102 may determine in step 203 that the parameter value has not reached or exceeded the first defined threshold (e.g., 0.6 lbf-in). To extract more of the tape 103, a user may exert a pulling force on the first end 103a of the tape 103. When the spring 101 is in the state depicted in FIG. 2A, the spring 101 may absorb some of the pulling force from the hub 105. In other words, the pulling force is not directly transferred to the hub 105, but is instead used to compress the spring 101, and is thus converted into potential energy. The situation depicted in FIG. 2A may be part of a first stage in which the first defined threshold has not been reached and the motor 107 remains deactivated. The first stage may rely on the spring 101 rather than the motor 107 to let out and retract the tape 103. During the first stage, the hub 105 may be stationary (e.g., non-rotating) relative to the housing 40.

In an embodiment, as more of the tape 103 is extracted (e.g., 10 feet or more), the spring 101 may be wound to a state depicted in FIG. 2B. In an embodiment, the spring 101 in FIG. 2B may be in a fully wound state in which it is no longer compressible or, more generally speaking, not capable of further elastic deformation. The fully wound state may correspond to a start of a second stage of the tape extraction. In an embodiment, the fully wound state of the spring 101 may be reached when, e.g., only a fraction (e.g., 25% or 50%) of the total length of the tape 103 has been extracted. In this fully wound state, the spring 101 may prevent more tape 103 from being let out, and may also transfer additional pulling force from the first end 103a of the tape 103 to the hub 105 (rather than absorbing the additional pulling force). In the situation depicted in FIG. 2B, the parameter value determined in step 201 may have a relatively higher value (e.g., 0.6 lbf-in), and the control circuit 102 may determine in step 203 that the parameter value has reached or exceeds the first defined threshold (e.g., 0.6 lbf-in).

Figure 2C:
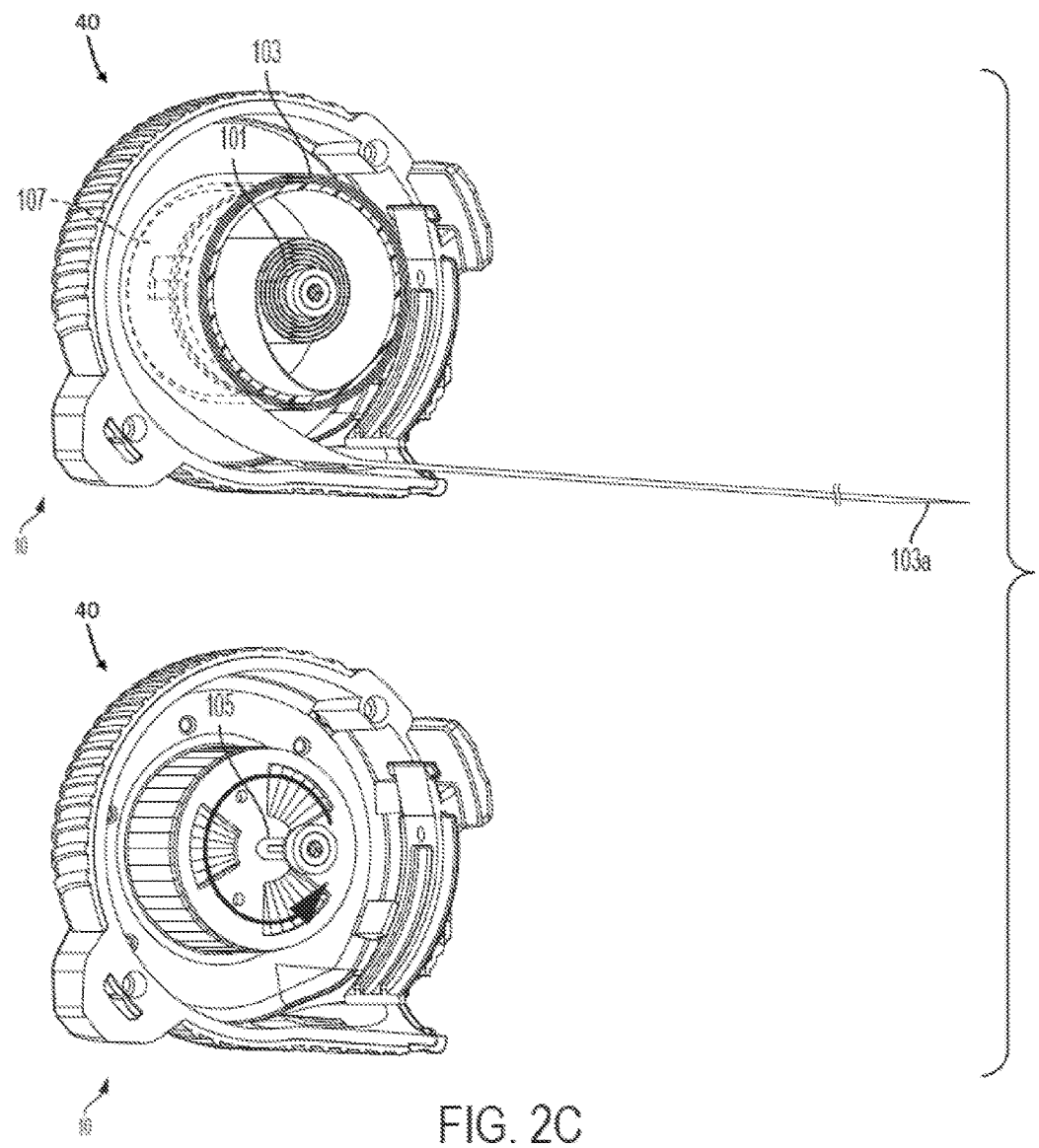

Referring back to FIG. 1G, in step 205, in response to a determination that the parameter value has reached or exceeds the first defined threshold, the control circuit 102 may activate the motor 107 to rotate the hub in a first direction (relative to, e.g., a stator of the motor 107) to unwind the spring 101 relative to the hub 105. For instance, FIG. 2C depicts the motor 107 rotating the hub 105 in a counterclockwise direction to unwind the spring 101 relative to the hub 105. The rotation output by the motor 107 may reduce the torque or force exerted by the spring 101 on the hub 105, and leave the spring 101 in a more relaxed state, as illustrated in FIG. 2C. As a result, more of the tape 103 (e.g., another 6 feet) can be extracted from the housing 40. In an embodiment, the motor 107 may be outputting rotation in the counterclockwise direction while the first end 103a of the tape 103 is continuing to be held by the user. In an embodiment, the hub bearing 104 may allow the motor 107 to rotate the hub 105 without also rotating the reel 109. Thus, in this embodiment, the motor 107 may unwind the spring 101 relative to the hub 105 without directly unwinding the tape 103 relative to the reel 109. In an embodiment, steps 201 through 205 may be repeated numerous times during extraction of the tape 103 from the housing 40, such as if the length of tape 103 that is extracted (e.g., 30 feet) is several times more than a total length of the spring 101 (e.g., 10 feet). In an embodiment, steps 203 and 205 may be based on whether the parameter value exceeds the first defined threshold (as opposed to whether the parameter value has reached or exceeds the first defined threshold).

In an embodiment, the motor 107 may be activated to rotate the hub 105 in the first (e.g., counterclockwise) direction (relative to a stator of the motor 107) for a defined duration or a defined number of revolutions, and then be immediately deactivated. In an embodiment, after the motor 107 has been activated to rotate the hub in the first direction, the motor may remain activated until the parameter value falls below the defined threshold by at least a defined buffer amount (e.g., 33% of the defined threshold). For instance, the motor 107 may remain activated until the parameter value falls from 0.6 lbf-in to 0.4 lbf-in, and then may be deactivated. The use of the buffer amount may prevent or reduce hysteresis between the activated state and the deactivated state of the motor 107.

Figure 1H:
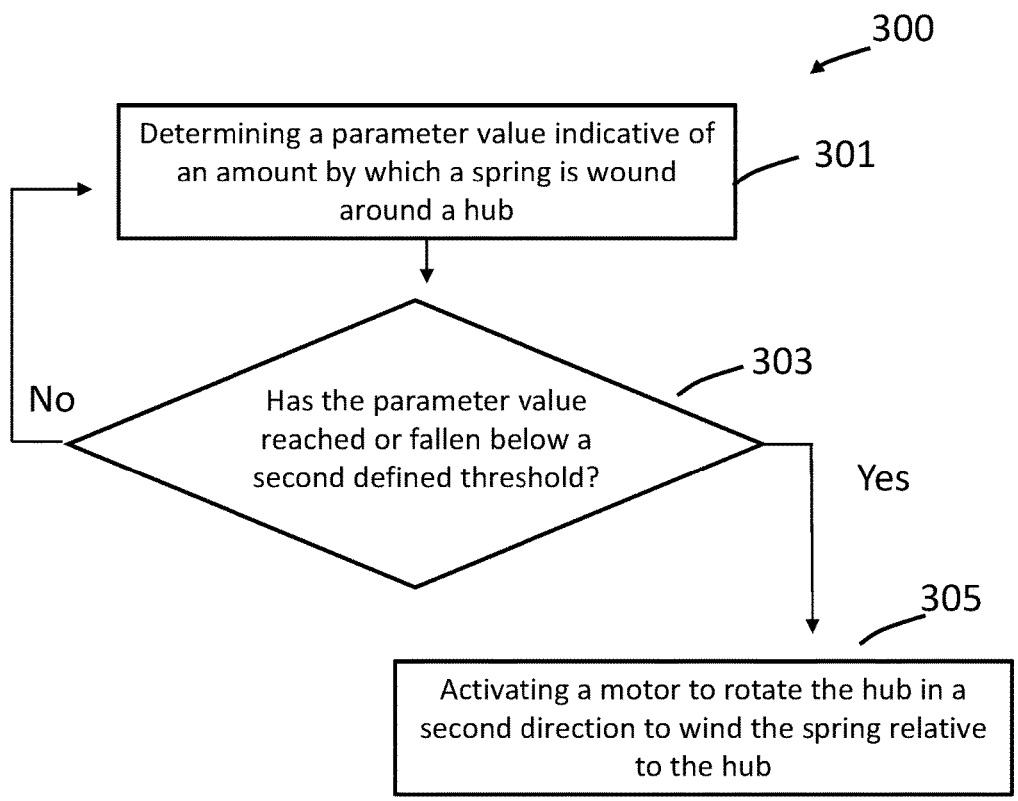
Figure 2D:
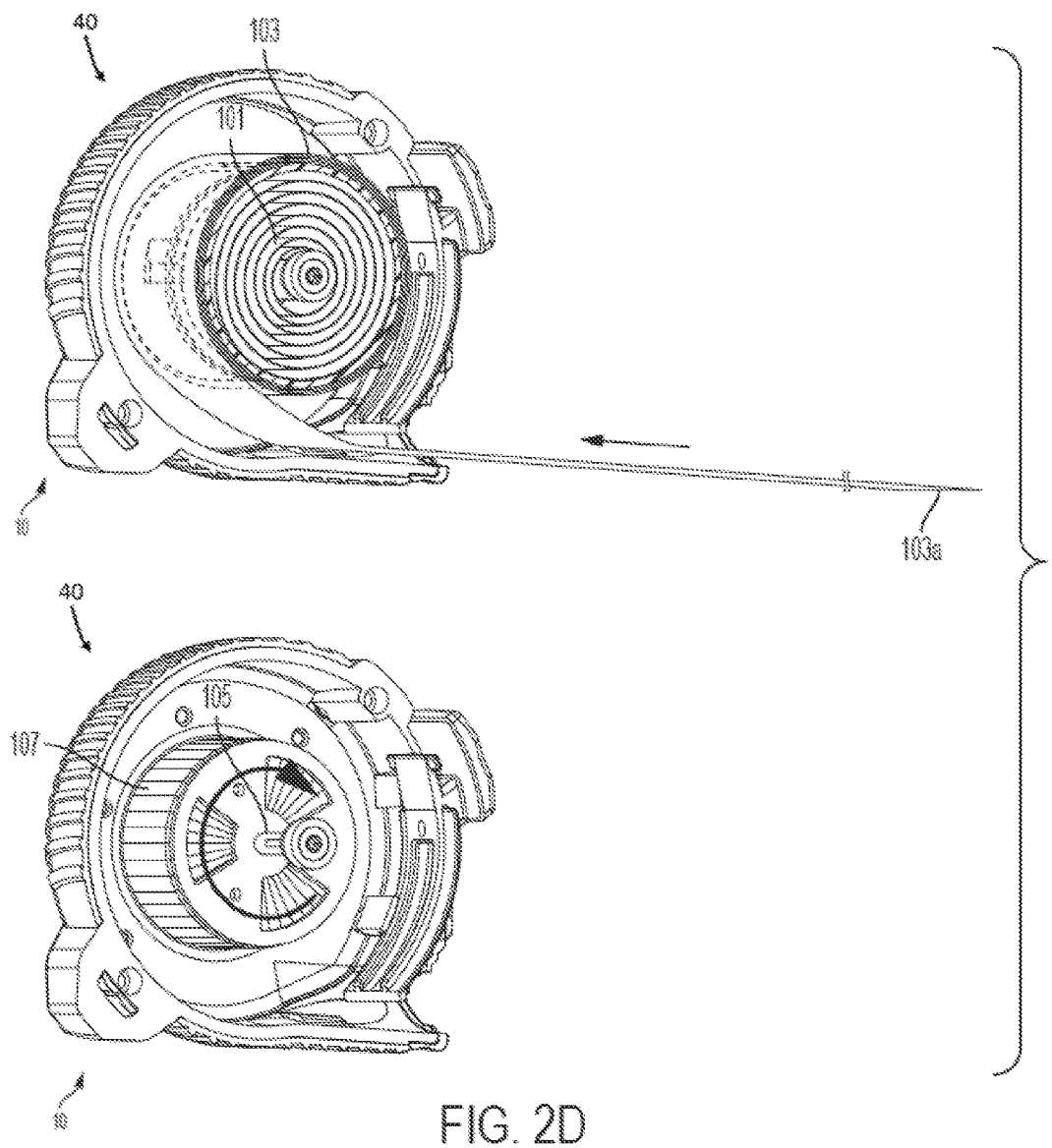

As discussed above, the spring 101 may be used to retract the tape 103 into the housing 40. For instance, when a user relaxes his or her grip on the first end 103a of the tape 103, or completely lets go of the first end 103a, the potential energy stored by the spring 101 may rotate the reel 109 in a second (e.g. clockwise) direction that retracts the tape 103 into the housing 40. In an embodiment, the motor 107 may be activated during the retraction of the tape 103 only when the parameter value has reached or fallen below a second defined threshold (e.g., 0.2 lbf-in). For instance, FIG. 1H illustrates an example method 300 by which the control unit 102 can activate the motor 107 to rotate the hub 105 in the second direction during the retraction of the tape 103. The method 300 may include a step 301, in which the control unit 102 determines the parameter value indicative of the amount by which the spring is wound around the hub. In step 303, the control unit 102 may determine whether the parameter value has reached or fallen below a second defined threshold. For example, the parameter value may be at, e.g., 0.4 lbf-in when retraction begins. As the spring 101 retracts the tape 103, the parameter value decreases. After a certain amount of tape 103 has been retracted (e.g., 6 feet), the parameter value may decrease to a second defined threshold (e.g., 0.2 lbf-in). An example of this situation is illustrated in FIG. 2D, which illustrates the spring 101 when the second defined threshold has been reached.

As further illustrated in both FIGS. 1H and 2D, in response to a determination that the parameter value has reached or fallen below the second defined threshold, the control unit 102 may in step 305 activate the motor to output rotation in the second (e.g., clockwise) direction to wind the spring relative to the hub. In an embodiment, the motor 107 may remain activated to output rotation in the second direction until the parameter value rises above the second defined threshold by a buffer amount (e.g., 100% of the second defined threshold). For instance, the motor 107 may remain activated until the parameter value reaches 0.4 lbf-in again, and then may be deactivated. As discussed above, the hub bearing 104 may allow the hub 105 to rotate without rotating the reel 109. That is, the motor 107 may wind the spring 101 relative to the hub 105 without directly rotating the reel 109 to retract the tape 103 (the reel 109 is directly rotated by the spring 101). In an embodiment, steps 301 through 305 may be repeated many times. In an embodiment, steps 303 and 305 may be based on whether the parameter value has fallen below the second defined threshold (as opposed to whether the parameter value has reached or fallen below the second defined threshold).

In an embodiment, the control unit 102 may selectively activate the motor 107 to maintain the parameter value in a range, such as a range of 0.2 lbf-in to 0.6 lbf-in. The motor 107 may output rotation in a first direction to decrease the parameter value if the value exceeds the range, or output rotation in a second direction to increase the parameter value if the value falls below the range. Thus, for instance, the motor 107 can be used to effectively maintain a tighter torque range so that there is a more controlled retraction of the tape 103.

In an embodiment, the control unit 102 may automatically activate and deactivate the motor 107, and thus provide an invisible user interface. In an embodiment, the determination of whether to activate the motor may be based on only the parameter value that indicates the amount by which the spring 101 is wound relative to the hub, such that manual activation of the motor 107 is not available. In another embodiment, the motor 107 may alternatively or additionally be manually activated. In such an embodiment, the tape rule 10 may include a mechanical button, touch screen button, or other user input element that, when selected, causes the motor 107 to rotate the hub 105. The user input element may allow a user to select a direction of rotation, or the direction of rotation may be fixed, or may be internally determined by the control unit 102.

In an embodiment, the tape rule 10/10A may have a mode, such as an auto slow-down mode, that causes the motor 107 to be activated to keep the tape 103 from being retracted too quickly by the spring 101. For instance, during retraction of the tape 103 into the housing 40, the spring 101 may exert a force or torque on the reel 109 or the tape 103 in a second direction, such as the direction illustrated on the top of FIG. 2D. If the force or torque is too high, the tape 103 may be retracted more quickly than is desirable. Thus, when the tape rule 10/10A is in the auto slow-down mode, the control circuit 102 or other component of the tape rule 10/10A may be configured to monitor a parameter value indicative of the force or torque being applied by the spring 101 on the reel 109 or tape 103. If the parameter value becomes too high, the control circuit 102 may activate the motor 107 to rotate the hub 105 in a first and opposite direction to, e.g., unwind the spring 101 such that the force or torque exerted by the spring 101 is reduced. In an embodiment, the force or torque being exerted by the spring 101 on the reel 109 or tape 103 may be related to the force or torque being exerted by the spring 101 on the hub 105, such that the parameter value being monitored may be the force or torque being exerted by the spring 101 on the hub 105. In an embodiment, the control circuit 102 may activate the motor 107 during at least part of the retraction of the tape 103, so as to keep the parameter value below a defined threshold. In an embodiment, the defined threshold may be a third defined threshold (e.g., 0.3 lbf-in) that is higher than the second defined threshold (e.g., 0.2 lbf-in) at which the spring 101 is wound during retraction, and lower than first defined threshold (e.g., 0.6 lbf-in) at which the spring 101 is unwound during extraction, as discussed above. In an embodiment, the use of the third defined threshold may be combined with the use of the second defined threshold and/or first defined threshold, such as to maintain the parameter value in a range between the second defined threshold and the third defined threshold during retraction of the tape 103. In an embodiment, the auto slow-down mode may be pre-set, such that the tape rule 10/10A is pre-programmed (e.g., during manufacturing) to be in this mode. In an embodiment, this mode may be manually activated, such as via a user input element.

Figure 3:
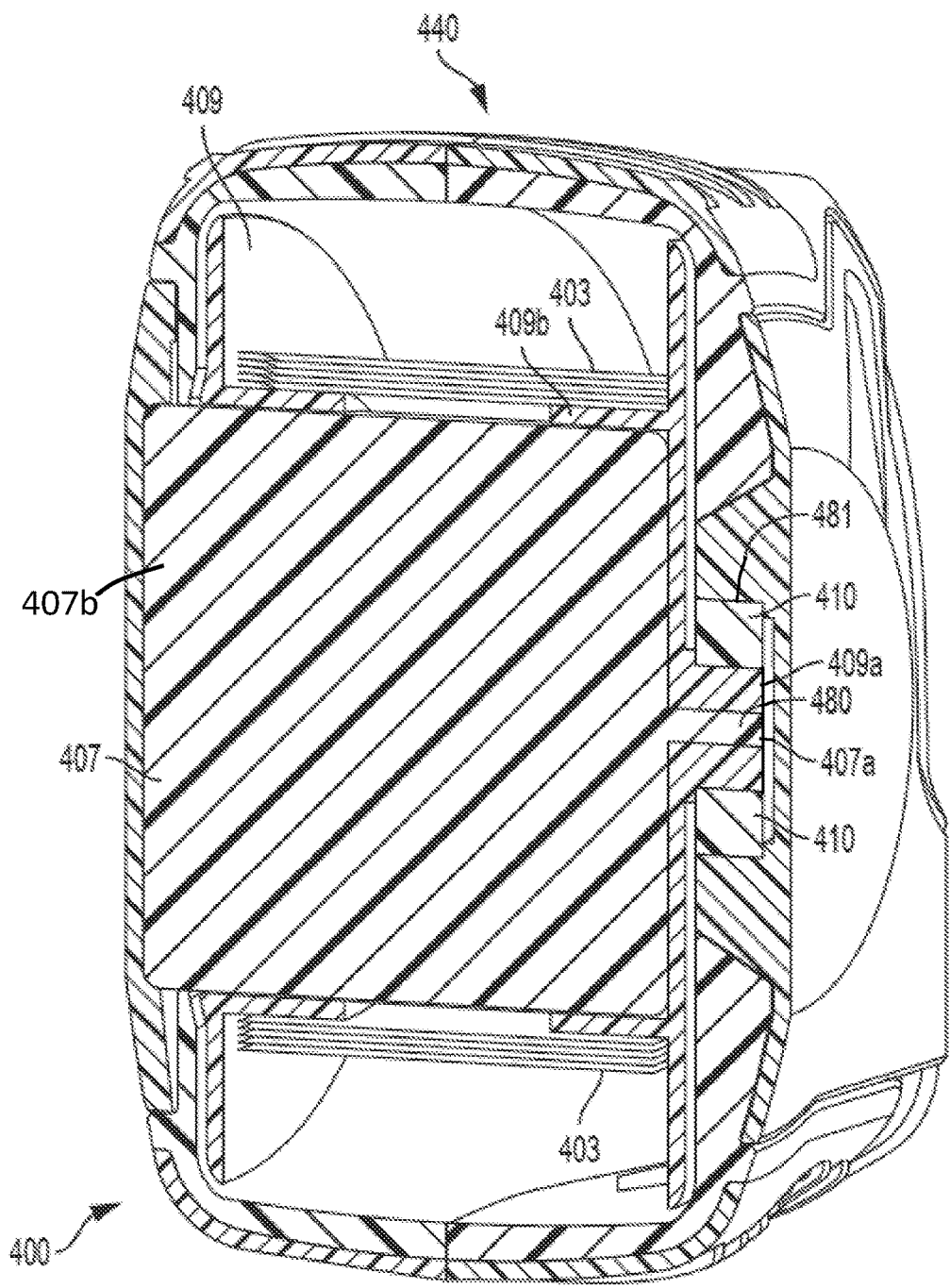
FIG. 3 is a sectional view of a tape rule, according to an embodiment hereof.

FIG. 3 illustrates an embodiment of a tape rule 400 that includes a motor 407, but does not include a retraction spring. In an embodiment, the motor 407 may be selectively activated based on an amount of torque or force being exerted by a tape 403 on a reel 409. More specifically, the tape rule 400 may include a housing 440, a reel 409, tape 403, and a motor 407. The reel 409 may be rotatably mounted within the housing 440. For instance, a reel bearing 410 may be fitted around a protruding portion 409a of the reel 409, and the reel bearing 410 and the protruding portion 409a may be received in a receptacle portion 481 of the housing 440. The reel bearing 410 may allow the reel 409 to rotate relative to the housing 410. In an embodiment, the tape 403 may be wound around a spool portion 409b of the reel 409.

In an embodiment, the motor 407 may have a shaft 407a connected to the reel 409. The shaft 407a may be directly connected to the reel 409, or may be indirectly connected (e.g., via a gearbox) to the reel 409. In FIG. 3, for instance, the shaft 407a of the motor 407 may be directly connected to the reel 409 via a receptacle portion 480 of the reel 409 that receives the shaft 407a. During extraction of the tape 403 from the housing 440, the tape 403 may exert a force or torque on the reel 409 that causes the reel 409 to rotate. The shaft 407a of the motor 407 in FIG. 3 may rotate with the reel 409 because it is connected thereto, even if the motor 407 has not been activated to output rotation at the shaft 407a. The rest of the motor 407 (e.g., a stator 407b) may also rotate with the reel 409, or may remain stationary relative to the housing 440.

In an embodiment, the tape rule 400 may include a control unit that is configured to determine a force or torque being exerted by the tape 403 on the reel 409. For instance, extracting the tape 403 may involve a user pulling on the tape 403, which may transfer the pulling force, in the form of a force or torque, to the reel 409 and accelerate the reel 409 to rotate in a first direction (e.g., counterclockwise). In some cases, the reel 409 may be accelerated from a stationary state to a rotating state. In an embodiment, the tape rule 400 may include a torque sensor configured to measure the force or torque being exerted by the tape 403 on the reel 409.

In an embodiment, the control unit may be configured to further determine whether the torque or force exerted by the tape 403 on the reel 409 has reached or exceeds a defined threshold. In some instances, it may take more torque to accelerate the reel 409 from a stationary state to a rotating state to initially extract the tape 403, than an amount of torque involved in maintaining the rotation of the reel 409 to extract more tape 403. In such instances, the force or torque exerted by the tape 403 on the reel 409 may reach or exceed the defined threshold during the initial extraction of the tape 403, when the reel 409 is starting from a non-rotating or otherwise stationary position.

In an embodiment, in response to a determination that the force or torque exerted by the tape 403 on the reel 409 exceeds the defined threshold, the control circuit may be configured to activate the motor 407 to output rotation at the shaft 407a to reduce the force or torque exerted by the tape 403 on the reel 409. For instance, when a user exerts a pulling force on the tape 403, the tape 403 in turn exerts a force or torque on the reel 409 that causes or will cause the reel 409 to begin rotating in a first direction. The motor 407 may assist the user by being activated to rotate the reel 409 in the first direction, such as by outputting rotation at the shaft 407a in the first direction (e.g., relative to the stator 407b). The shaft 407a may exert a force or torque on the reel 409 in the first direction, which may reduce the pulling force that a user needs to exert on the tape 403, and thus may reduce the amount of force or torque being exerted by the tape 403 on the reel 409. Thus, in an embodiment, the motor 407 may assist a user in rotating the reel 409 (e.g., by using energy from a battery attached to the motor 407), so that most or all of the rotation of the reel 409 is driven by the motor 407, rather than being manually driven by a user. In an embodiment, the rotation output by the motor 407 in the first direction may directly force the tape 403 to extend from the housing 440. In an embodiment, the motor 407 may also be manually activated to extract the tape 403.

In an embodiment, after the motor 407 is activated to rotate the reel 409, the torque or force exerted by the tape 403 on the reel 409 may decrease. For example, a user may relax his or her grip on the tape 403 as the motor 407 takes over in driving the rotation of the reel 409. When a control circuit determines that the force or torque being exerted by the tape 403 on the reel 409 falls below the defined threshold by any amount, the control circuit may deactivate the motor. Alternatively, the motor 407 may be deactivated when the force or torque falls below the defined threshold by at least a defined buffer amount.

In an embodiment, the motor 407 may be activated to output rotation in a second and opposite direction to retract the tape 403 into the housing 440. In an embodiment, the rotation output by the motor 407 may directly rotate the reel 409, and thus directly cause retraction of the tape 403 into the housing 440. In an embodiment, the activation of the motor 407 in the second direction may be manually triggered (e.g., via a button or other user input element).

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A tape rule comprising:
   a housing;
   a hub rotatably mounted within the housing;
   a reel rotatably mounted within the housing;
   a tape wound around the reel;
   a spring wound around the hub and attached to at least one of the reel and the tape, wherein the hub comprises an axial member around which the spring is wound, and wherein the axial member of the hub is disposed within the reel; and a motor disposed adjacent to the hub and configured, when activated, to rotate the hub to wind or unwind the spring relative to the hub to adjust an amount by which the spring is wound around the hub.

2. The tape rule of claim 1, wherein the amount by which the spring is wound around the hub is configured to increase as the tape is extracted from the housing, and wherein the motor is configured, when activated, to rotate the hub in a direction that unwinds the spring relative to the hub to decrease the amount by which the spring is wound around the hub.

3. The tape rule of claim 2, wherein the tape rule is configured, during extraction of the tape from the housing,
to determine a parameter value indicative of the amount by which the spring is wound around the hub,
to determine whether the parameter value has reached or exceeds a defined threshold, and
in response to a determination that the parameter value has reached or exceeds the defined threshold, activate the motor to unwind the spring relative to the hub.

4. The tape rule of claim 3, wherein the parameter value is a value of a force or torque exerted by the spring on the hub, or is a value of a length of the tape that has been extracted from the housing.

5. The tape rule of claim 4, further comprising a battery, wherein the motor is configured to draw current from the battery to maintain the hub in a substantially rotationally fixed state relative to the motor as the tape is extracted from the housing, wherein the tape rule is configured to determine the value of the force or torque by: determining an amount of the current being drawn by the motor from the battery to maintain the hub in the substantially rotationally fixed state as the tape is extracted from the housing, and determining the value of the force or torque based on the amount of the current being drawn by the motor to maintain the hub in the substantially rotationally fixed state.

6. The tape rule of claim 3, wherein the tape rule is further configured, after activating the motor to unwind the spring,
to determine whether the parameter value has fallen below the defined threshold by at least a defined buffer amount, and
in response to a determination that the parameter value has fallen below the defined threshold by at least the defined buffer amount, to deactivate the motor.

7. The tape rule of claim 3, wherein the defined threshold corresponds to the spring being in a fully wound state in which the spring is substantially non-compressible.

8. The tape rule of claim 3, wherein the defined threshold is reached when less than half of a total length of the tape has been extracted from the housing.

9. The tape rule of claim 1, wherein the amount by which the spring is wound around the hub is configured to decrease as the tape is retracted into the housing, and wherein the motor is configured, when activated, to rotate the hub in a direction that winds the spring relative to the hub to increase the amount by which the spring is wound around the hub.

10. The tape rule of claim 9, wherein the tape rule is further configured, during retraction of the tape into the housing:
to determine a parameter value indicative of the amount by which the spring is wound around the hub,
to determine whether the parameter value has reached or fallen below a defined threshold, and
in response to a determination that the parameter value has reached or fallen below the defined threshold, activate the motor to wind the spring relative to the hub, and
in response to a determination that the parameter value has subsequently risen above the defined threshold by at least a defined buffer amount, to deactivate the motor.

11. The tape rule of claim 1, wherein the tape rule is configured to determine a parameter value indicative of the amount by which the spring is wound around the hub, and is configured, after the parameter value has reached or exceeded a first defined threshold, to maintain the parameter value in a range between the first defined threshold and a second defined threshold lower than the first defined threshold by causing the motor to rotate the hub in a first direction to unwind the spring or causing the motor to rotate the hub in a second direction to wind the spring to adjust the parameter value.

12. The tape rule of claim 1, further comprising a clutch disposed between the motor and the hub, wherein the clutch is configured to selectively disengage the motor from the hub based on a value of a force or torque exerted by the hub on the motor.

13. The tape rule of claim 1, further comprising a user input element disposed on or in the housing and configured to receive a user input, wherein the tape rule is configured to activate the motor in response to the user input element receiving the user input.

14. The tape rule of claim 1, wherein, during retraction of tape into the housing, the spring is configured to exert a force or torque on the reel or on the tape in a second direction, and wherein the tape rule has a mode that, when pre-set or manually activated, causes the tape rule to activate the motor to rotate the hub in a first and opposite direction to reduce the force or torque exerted by the spring on the reel or on the tape during at least part of the retraction of the tape into the housing.

15. The tape rule of claim 14, wherein the mode is an auto slow-down mode that, when pre-set or manually activated, causes the tape rule to determine whether a parameter value indicative of the force or torque being applied by the spring on the reel or tape has reached or exceeds a defined threshold, and wherein the motor is activated to rotate the hub in the first direction during the retraction of the tape in response to a determination that the parameter value has reached or exceeds the defined threshold.

16. A tape rule comprising:
a housing;
a reel rotatably mounted within the housing;
a tape wound around the reel;
a motor connected to the reel, wherein the tape is configured to exert a force or torque on the reel during extraction of the tape from the housing,
wherein the tape rule is configured, during extraction of the tape from the housing:
to determine whether the force or torque exerted by the tape on the reel has reached or exceeds a defined threshold, and
in response to a determination that the force or torque exerted by the tape on the reel has reached or exceeds the defined threshold, to activate the motor to output rotation to reduce the force or torque exerted by the tape on the reel.

17. The tape rule of claim 16, wherein the force or torque exerted by the tape on the reel causes or will cause the reel to rotate in a first direction, and wherein the motor, when activated, is also configured to rotate the reel in the first direction.

18. The tape rule of claim 17, further comprising a torque sensor disposed adjacent to the reel or to the motor and configured to measure a torque being exerted by the tape on the reel.

19. The tape rule of claim 18, wherein the tape rule is configured to activate the motor in a second and opposite direction to retract the tape into the housing.

20. A tape rule comprising:
a housing;
a hub rotatably mounted within the housing;
a reel rotatably mounted within the housing;
a tape wound around the reel;
a spring wound around the hub and attached to at least one of the reel and the tape;
a motor disposed adjacent to the hub and configured, when activated, to rotate the hub to wind or unwind the spring relative to the hub to adjust an amount by which the spring is wound around the hub; and
a torque sensor disposed between the motor and the hub, wherein the hub is connected to the motor via the torque sensor, and wherein the tape rule is configured to determine a value of a force or torque exerted by the spring on the hub based on a measurement from the torque sensor.

* * * * *